United States Patent
Hanlon

(10) Patent No.: US 9,719,356 B2
(45) Date of Patent: Aug. 1, 2017

(54) METHOD OF FINISHING A BLADE

(71) Applicant: ROLLS-ROYCE PLC, London (GB)

(72) Inventor: Roisin Louise Hanlon, Derby (GB)

(73) Assignee: ROLLS-ROYCE plc, London (GB)

( * ) Notice: Subject to any disclaimer, the term of this patent is extended or adjusted under 35 U.S.C. 154(b) by 357 days.

(21) Appl. No.: 14/301,680

(22) Filed: Jun. 11, 2014

(65) Prior Publication Data
US 2014/0373503 A1 Dec. 25, 2014

(30) Foreign Application Priority Data

Jun. 21, 2013 (GB) .................................. 1311052.3
Jun. 21, 2013 (GB) .................................. 1311053.1

(51) Int. Cl.
| | | |
|---|---|---|
| G06F 19/00 | (2011.01) | |
| F01D 5/14 | (2006.01) | |
| F01D 9/02 | (2006.01) | |
| G05B 19/401 | (2006.01) | |

(52) U.S. Cl.
CPC ............... *F01D 5/147* (2013.01); *F01D 9/02* (2013.01); *G05B 19/401* (2013.01); *F05D 2230/18* (2013.01); *G05B 2219/37365* (2013.01); *G05B 2219/37569* (2013.01); *G05B 2219/37571* (2013.01); *G05B 2219/45147* (2013.01); *G05B 2219/50067* (2013.01); *G05B 2219/50207* (2013.01); *Y10T 29/49336* (2015.01)

(58) Field of Classification Search
CPC ........ F01D 5/147; F01D 9/02; F01D 2230/18; G05B 19/401; G05B 2219/45147
See application file for complete search history.

(56) References Cited

U.S. PATENT DOCUMENTS

| | | | | |
|---|---|---|---|---|
| 4,896,278 A * | 1/1990 | Grove | .................. | G01N 29/265 250/559.46 |
| 5,446,673 A | 8/1995 | Bauer et al. | | |
| 5,815,400 A * | 9/1998 | Hirai | .................... | G05B 19/401 700/173 |

(Continued)

FOREIGN PATENT DOCUMENTS

| | | |
|---|---|---|
| DE | 42 23 483 A1 | 1/1994 |
| EP | 1 254 738 A2 | 11/2002 |

(Continued)

OTHER PUBLICATIONS

European Search Report issued in European Patent Application No. EP 14 17 1908 on Aug. 4, 2014.
Dec. 6, 2013 Search Report issued in British Patent Application No. GB1311052.3.
Dec. 6, 2013 Search Report issued in British Patent Application No. GB1311053.1.

*Primary Examiner* — Michael D Masinick
(74) *Attorney, Agent, or Firm* — Oliff PLC

(57) ABSTRACT

An automated technique for finishing gas turbine engine blades or vanes by generating a bespoke tooling path for each blade or vane. The bespoke tooling path is generated by scanning the aerofoil surface to generate a 3-D electronic representation of the surface. The 3-D electronic surface is then analyzed to identify imperfections or defects, and then a machining path a generated through which the imperfections can be removed. The machining path is determined so as to smoothly blend the surface back to the underlying surface where the imperfections had been present. In this way, the resulting aerofoil, once machined, has optimized aerodynamic performance.

16 Claims, 5 Drawing Sheets

(56) References Cited

U.S. PATENT DOCUMENTS

| | | | | |
|---|---|---|---|---|
| 7,908,759 B2* | 3/2011 | McLean | ............... | G01B 21/04 |
| | | | | 33/503 |
| 8,131,107 B2* | 3/2012 | Sun | ............... | G06K 9/6298 |
| | | | | 382/228 |
| 8,464,777 B2* | 6/2013 | Zhu | ............... | G05B 19/4093 |
| | | | | 164/113 |
| 8,978,249 B2* | 3/2015 | Hovel | ............... | B23P 6/005 |
| | | | | 29/402.09 |
| 2004/0083024 A1* | 4/2004 | Wang | ............... | B23P 6/002 |
| | | | | 700/195 |
| 2006/0099074 A1* | 5/2006 | Kopmels | ............... | F01D 5/186 |
| | | | | 416/97 R |
| 2011/0087352 A1 | 4/2011 | Krause | | |
| 2011/0308966 A1 | 12/2011 | Secherling et al. | | |
| 2012/0124834 A1 | 5/2012 | Cholet et al. | | |
| 2012/0126141 A1* | 5/2012 | Pulisciano | ............... | G01B 11/25 |
| | | | | 250/459.1 |
| 2014/0081441 A1* | 3/2014 | Regan | ............... | G05B 19/4093 |
| | | | | 700/98 |

FOREIGN PATENT DOCUMENTS

| | | | |
|---|---|---|---|
| EP | 1 559 500 | A1 | 8/2005 |
| EP | 2 555 069 | A1 | 2/2013 |
| FR | 2 890 879 | A1 | 3/2007 |

\* cited by examiner

METHOD OF FINISHING A BLADE

CROSS-REFERENCE TO RELATED APPLICATIONS

This application is based upon and claims the benefit of priority from British Patent Application Number 1311053.1 filed 21 Jun. 2013 and British Patent Application Number 1311052.3 filed 21 Jun. 2013, the entire contents of which are incorporated by reference.

BACKGROUND OF THE INVENTION

1. Field of the Disclosure

The present invention relates to a method of finishing a component. In particular, the present invention may be applied to the finishing of a blade for a gas turbine engine comprising adaptive machining of the blade's aerodynamic surface.

2. Description of the Related Art

Gas turbine engines comprise various precision engineered components. The precise dimensions of these components are crucial in determining the performance of the component, and thus the performance of the gas turbine engine, for example in terms of specific fuel consumption. Thus, many components need to be manufactured to very tight tolerances.

Such components that must be manufactured to a high degree of accuracy include aerofoil-shaped components in a gas turbine engine, including the various rotating blades and stationary vanes. The profile of such aerofoil components is critical in determining the performance of the engine.

Presently, the final step in manufacturing many such aerofoil components involves manually dressing the components. In other words, a skilled human operator holds a blade against a polishing or dressing emery belt to remove any unwanted features, such as features that may have resulted from a casting process used in an earlier manufacturing step. In this way, the human operator uses their skill and judgement to manually finish the blade by eye.

Even though the human operators are highly skilled, there is potential for the finished blades to contain inaccuracies, imperfections, or inconsistencies. For example, the human operators may remove too little or too much material from a certain part of the blade, for example when attempting to remove a witness feature resulting from a casting process. Such a blade may still be within inspection tolerance, but may contain minor imperfections on the surface that may have a significant detrimental impact on the performance of the blade. Furthermore, the process is extremely labour intensive and time consuming, and thus expensive. In addition, it is possible that the repetitive nature of the manual finishing of blades may lead to health problems for the operators.

OBJECTS AND SUMMARY

According to an aspect, there is provided a method of finishing an aerodynamic surface of a component (for example an aerofoil, which term includes a blade or vane having an aerofoil surface) for a gas turbine engine to produce a finished component from a rough component. The method comprises scanning aerodynamic surfaces of the rough component to obtain scanned electronic 3-D data representing the scanned surfaces of the rough component. The method comprises identifying, using the scanned 3-D data, specific features to be removed from the rough component. The method comprises generating a bespoke tooling path to remove the features identified for removal. The method comprises machining the rough component according to the generated bespoke tooling path so as to thereby produce a finished component.

The component may be an aerofoil. The aerodynamic surfaces may be gas washed surfaces of the aerofoil. The rough component may be a rough aerofoil. The finished component may be a finished aerofoil. All aspects of the invention that are described in relation to a component may also apply to an aerofoil.

By way of example, the finished component may be any one of a turbine rotor blade, a compressor rotor blade, a turbine stator vane or a compressor stator vane. The method may be applied to single blades, twin blade segments, or multiple blade segments.

A 3-D structured light system may be used to scan the aerodynamic surface(s) of the rough component. Additionally or alternatively, any other suitable system may be used to generate an accurate electronic 3-D model of the actual aerodynamic surfaces of the rough component (which may be the output from a casting or forging process), such as a 3-D laser system.

By generating a bespoke tooling path for each component (such as a blade or vane) in the manner specified above and elsewhere herein, each component can be adaptively machined relative to the rest of the surface. This means that the finished component has a smooth surface with substantially no discontinuities, for example in rate of change of surface height or in curvature (which may be referred to herein as profile gradient). Thus, it could be said that the component's (aerodynamic) surface is adaptively machined to ensure that unwanted surface features may be removed in such a way that the resulting surface is blended (for example smoothly blended) back to the rest of the surface. This helps to optimize the aerodynamic performance of the component, which may be an aerofoil, or at least to ensure that it is as close to the design intent as possible.

The bespoke tooling path may take any shape or track as required, depending on the precise shape of the rough component. For example, in many cases it may not be necessary for the whole surface of the rough component to be machined. For example, only certain "high spots" may need to be machined, and the tooling path may be set accordingly.

Optionally, a final additional step of fine surface finishing may or may not be used after the raw casting has been machined according to the bespoke tooling path. Such an additional fine surface finishing step (where used) may be performed by a human operator. Alternatively, the fine surface finishing step may be automated, for example being performed by a robot, or a machine tool. Such an automated surface finishing step may be referred to as an automated linishing/grinding/polishing step. Such an automated step may use the tooling path generated for and used in the machining step. For example, any such fine surface finishing step may take the generated tooling path, take an offset in the direction of the surface, and finish according to the offset path. Such an offset may be the minimum required for surface finishing, for example less than 50 microns, for example on the order of 15 microns. Alternatively a compliant linishing/grinding/polishing process may be employed whereby a set cutter path is used for all components, with their unique offset applied, and all variation in the cutter path is due to the variation in the movement of the polishing head due to the force exerted on the component. Any fine surface finishing step (where used) would not involve removing specific features, as these would have been removed already in the step of machining according to the bespoke tooling path.

Where a fine surface finishing step is used, any suitable finishing tool may be used. For example, abrasive grinding points (steel or carbide body plated by super-abrasive grits or bonded abrasive points), abrasive wheels (plated or bonded) or abrasive belts may be used. In all cases abrasive tools may have solid hard cutting contact point with material (so in case of belts, a solid hard backing at the cutting point may be used). Purely by way of example, abrasive wheels or belts may be particularly suitable for large areas of surface finishing, and abrasive grinding points may be more suitable for smaller localised surface treatment, such as at or near trailing edges. However, it is emphasized that such a fine surface finishing step is optional and may or may not be employed after the step of machining the rough aerofoil.

Automated finishing of an aerofoil (or other component) as described and claimed herein may reduce, or substantially eliminate, the need to manually dress the blades (or other components) using human operators. This may result in greater accuracy of the finished components. It may also reduce the health and safety risks associated with operating powerful machinery. The automated process may be quicker than the equivalent hand dressing operation and/or may result in a reduction in scrap, for example by eliminating human error. The automated finishing may also allow certain features to be machined more accurately for each individual blade, for example accurate machining of profiled end walls for each blade, and thinner trailing edges.

The rough component (such as an aerofoil) may be the output of a casting process or a forging process, for example. The specific features identified for removal may include plus-metal features produced in the casting or forging process. Such features may be common in cast components, and so it is particularly advantageous that the method allows these features to be identified and adaptively removed.

According to an aspect, there is provided a method of manufacturing a component (such as a blade or vane for a gas turbine engine), the component comprising aerodynamic surfaces. The method comprises generating (for example by forging or casting) a rough component corresponding to the component being manufactured. The method also comprises finishing the rough component so as to form the aerodynamic surfaces of the using any of the finishing methods described and/or claimed herein.

The plus-metal features may include, for example, features due to die-lines, casting mould defects and p-pins, or in the case of forging, flash lines. P-pins may be inserted into a mould during casting to hold the (typically ceramic) core in position before and during casting. For example, p-pins may be inserted into a wax pattern during a so-called "lost wax" casting process. The plus-metal features may also include "chaplets" that are used to locate the core during casting.

The bespoke tooling path may be generated such that the step of machining involves removing the identified features so as to be smoothly blended to match the surrounding aerodynamic surfaces. This may avoid faceting on the machined surface of the component (such as an aerofoil), which may have a detrimental impact on aerodynamic performance.

Such a smooth blend to the surrounding aerodynamic surfaces may be achieved in any suitable way. For example, the cutting path could be set such that the identified feature may be removed to leave the surface having no discontinuity in profile gradient or rate of change of profile gradient. For example, where the component is an aerofoil, the cutting path could be set such that the identified feature may be removed to leave the surface having no discontinuity in profile gradient or rate of change of profile gradient around a cross-section through the aerofoil perpendicular to the span of the aerofoil, or around any or all cross-sections through the aerofoil. This may be achieved by, for example, smoothing and/or blending any plus-metal features (or "high points"). Purely by way of example, the smoothing and/or blending may follow the profile gradient of the surrounding boundary layer.

Indeed, any one or more of the local surface height, the rate of change of surface height, rate of change of profile gradient, rate of change of rate of change of profile gradient or further derivatives of profile gradient or surface height with position may be used (for example by avoiding or removing discontinuities therein) over the portion of the finished component around the feature identified for removal in order to create a smooth blend to the surrounding aerodynamic surfaces, and thus the tooling path may be set accordingly. Such rates of change of profile gradient or surface height (which may be referred to as derivatives of profile gradient or surface height with position on the blade surface) may be with respect to any or all cross-sections through the blade (or other component). Where the term "profile gradient" is used herein (for example with regard to rates of change thereof), this is equivalent to, and may be replaced by, the term "curvature".

In the case of an aerofoil component, surface height may be defined as, for example, the perpendicular distance (or displacement) of a point on the surface from the local camber line of the aerofoil. In this regard, the local camber line may be the camber line of a cross-section through the aerofoil surface that passes through the surface point at which the surface height is to be measured and is perpendicular to the span of the aerofoil.

It will be appreciated that a similar, or indeed the same, process may be used to identify the features for removal as that used in order to determine the machine path. Thus, for example, the step of identifying the features to be removed may comprise comparing the scanned 3-D data at a given position on the scanned surface to the scanned 3-D data at neighbouring positions on the scanned surface so as to determine the local shape of the scanned surfaces. The process may thus involve analysing the surface as a whole, or at least the local surface at each position, in order to determine unwanted "high spots", for example using the various derivatives of surface height and/or curvature with respect to surface position referred to above.

The process may be said to involve identifying anomalies (or discontinuities) in the rate of change of surface height, rate of change of profile gradient, and/or derivatives thereof (i.e. rates of change of the rates of change and so on), and then calculating a machining, or tooling path, to remove such anomalies. In this regard, the method may involve electronically generating a representative "parent" surface from the scanned 3-D data, the parent surface having a smooth, continuous surface, for example no discontinuities in the rate of change of surface height, profile gradient, and/or derivatives thereof, and the "anomalies" could be identified (and subsequently removed) with respect to that "parent" surface.

It will be appreciated that, in any aspect of the invention, the features identified for removal, and the cutting path required to remove the identified features, may be determined from the scanned data alone. Thus, it may not be necessary to use any design data to identify the features for removal and/or to determine the cutter paths for their removal. Thus, the step of identifying, using the scanned 3-D data, specific features to be removed from the rough component (such as an aerofoil) may comprise using the scanned 3-D data alone, for example without the use of any design, reference and/or datum data.

In practice, features that have a surface height greater than about 10 to 20 microns higher than would be desirable according to an "ideal" or "parent" surface may be identified and removed, for example using the methods described herein. Indeed, the method may use a pre-determined set of rules to determine whether a particular feature should be removed in the machining step. Such rules may relate to, for example, the height (above the "parent" surface) and/or the width or breadth of a particular anomaly.

Where the terms "machining" or "cutting" are used herein, it will be appreciated that these include any suitable process for removing material, including (by way of non-limitative example), milling and grinding.

A curve-fitting technique may be used to identify anomalies in the rate of change of the surface height, profile gradient, or derivatives thereof.

Optionally, the step of identifying the features to be removed may comprise comparing the scanned electronic 3-D data with datum electronic 3-D data representing the component (such as an aerofoil) as designed. For example, the method may comprise comparing the rate of change of height of the surface of the component, the rate of change of profile gradient, or derivatives thereof, at corresponding positions in the scanned and datum electronic 3-D data. However, this may not be required, because the features may be identified, and the tooling path determined, from the scanned data alone.

Where the component is an aerofoil, the step of identifying the features to be removed may comprise comparing the scanned electronic 3-D data representing the trailing edge of the aerofoil with datum electronic 3-D data representing the trailing edge of the aerofoil as designed. If the scanned 3-D data shows that the thickness of the trailing edge of the rough aerofoil is greater than the trailing edge as designed, the bespoke tooling path may be generated so as to reduce the thickness of the trailing edge. Thus, the method may allow the trailing edge to be thinner than that produced from a casting or forging, thereby improving the efficiency of the aerofoil.

The scanned electronic 3-D data may be compared with the datum electronic 3-D data to check for any dimensional errors in the rough component (such as an aerofoil). This may allow dimensional correction of the rough component to be incorporated into the bespoke tooling path.

The component (such as an aerofoil) may have internal cavities separated from external surfaces by a wall thickness. The method may further comprise taking an X-ray image of the rough component including the cavities. The method may also comprise determining, from the X-ray image, the wall thickness of the rough component. The determined wall thickness may be used in the step of generating the bespoke tooling path, such that, after the machining step, the finished component has a predetermined wall thickness. The finished component may have the desired external aerodynamic surfaces as well as the desired wall thickness.

As such, the method may involve using an X-ray image to ensure that a wall thickness of the finished aerofoil (or other component) is at a predetermined value, and/or above a minimum value. The bespoke tooling path may be set to ensure that the wall thickness is above a minimum value. The bespoke tooling path may be set to ensure that the wall thickness is below a maximum value. The predetermined and/or minimum and/or maximum wall thickness may vary around the component.

Indeed, according to an aspect, there is provided a method of manufacturing a component for a gas turbine engine, the component having internal cavities and external aerodynamic surfaces separated by a wall thickness. The method comprises taking an X-ray image of an over-sized raw form of the component, the raw form including the internal cavities. The method comprises generating a bespoke tooling path for the raw form based on the X-ray image and desired external aerodynamic surfaces of the component, the tooling path being set to produce a predetermined wall thickness for the component. The method comprises machining the raw form according to the generated bespoke tooling path so as to thereby produce the component having the desired external surfaces and predetermined wall thickness.

This aspect of the invention may be used to generate a bespoke tooling path for individual blades to enable the wall thickness to be set accurately. The X-ray imaging may allow the wall thickness to be measured accurately, meaning that the tooling (or machining) path can be set within tight limits i.e. without having to take into account large variation in unknown dimensions. In this way, the wall thicknesses can be machined (according to the generated tooling path) such that they are above a minimum level required to maintain desired mechanical properties, but still as thin as possible down to that minimum level. The average wall thickness and/or the variation in wall thickness between similar blades may thus be reduced by the invention.

Thinner walls may reduce the weight of the component, which may be particularly beneficial where the component is a blade. If the blades are rotating blades supported by a disc, for example, this reduced blade weight means that any rotating and/or fixing components that hold the blades to the engine (such as discs and root fixings—including shanks and fir-trees—between discs and blades, for example) may also be smaller and/or lighter. Thus, any weight saving may be compounded. Weight saving may be beneficial for all gas turbine engines, and may be particularly beneficial for gas turbines used for aircraft.

Additionally or alternatively, having better control of the wall thickness of a blade (as provided by this aspect of the present invention) may allow the performance and/or life of the blade/engine to be improved. For example, the performance and/or life of the blade may be set according to wall thicknesses that spread over a smaller range than with conventional blade manufacturing methods, meaning that the performance and/or life of the blade can be known more accurately. Thus, the worst possible performance/life that may need to be accounted for (for example at worst case tolerance stack-up) can be improved with more control of the wall thickness, without compromising other properties, such as blade weight or cooling requirements. Additionally or alternatively, if the aerofoils are blades that are attached to a rotating disc, the life of the disc may be increased by reducing the weight of the attached blades.

The rough component (such as an aerofoil) may be an over-sized casting or forging. Such an over-sized casting or forging may allow the cutting path to be generated so as to produce the desired external aerofoil shape whilst maintaining tight control of wall thickness around the aerofoil. For example, different raw castings or forgings of the same design of component may have the cavities in slightly different position relative to the external surfaces. This may mean that, where the method includes using X-rays to control the wall thickness, the tooling path may need to change between the different castings in order to maintain the desired wall thickness around the aerofoil (or other component), whilst also having the desired external aerodynamic shape. Using an over-sized casting may facilitate this difference in tooling path whilst retaining the same external aerodynamic shape.

Where an X-ray image is used, it may be a CT scan. The X-ray image may be a 3-D image of the rough aerofoil. Additionally or alternatively, the method may comprise taking a plurality of X-ray images at cross-sections through the component. For example, where the component is an aerofoil, the method may comprise taking a plurality of X-ray images at cross-sections through the aerofoil that are substantially normal to the camber line of the aerofoil.

The method may comprise inspecting the rough component (such as an aerofoil) to determine whether it is possible to generate a bespoke tooling path that will result in the finished component being within design tolerance after the step of machining the surfaces of the rough component. Such a step, where present, may be performed before the step of identifying the features to be removed. If it is determined that the finished component will not be within design tolerance after the step of machining, the rough component may be discarded and the steps of identifying the specific features, generating the bespoke tooling path and machining the rough component may be omitted. This may avoid the time and expense involved in performing the extra steps in the event that the resulting component would still be outside design tolerance.

Any suitable method could be used to determine whether the finished component would be within design tolerance. For example, the scanned electronic 3-D data may be compared with datum electronic 3-D data representing the aerodynamic surfaces as designed. Alternatively or additionally, the step of determining whether the finished component would be within design tolerance could be performed before scanning the aerodynamic surfaces, for example using a co-ordinate measuring machine (CMM).

After the step of machining the rough component to produce the finished component, the finished component may be inspected to ensure that it is within design tolerance. Any suitable method could be used, for example using a CMM. This step may be used to ensure that the machining step has not taken the component outside the design tolerance.

According to an aspect, there is provided a method of finishing multiple aerofoils for use in a gas turbine engine, the method comprising performing the method as described above and elsewhere herein to each individual aerofoil. Accordingly, a bespoke tooling path that is unique to each aerofoil may be generated to remove the features identified for removal. In this way, the aerodynamic performance of each aerofoil may be optimized.

According to an aspect, there is provided a blade or vane for a gas turbine engine having an aerodynamic (i.e. gas-washed) surface, such as an aerofoil surface, finished according the steps described and/or claimed herein.

According to an aspect, there is provided a gas turbine engine comprising at least one blade or vane having an aerodynamic (i.e. gas-washed) surface, such as an aerofoil surface, finished according to the steps described and/or claimed herein.

BRIEF DESCRIPTION OF THE DRAWINGS

For a better understanding of the present disclosure, reference will now be made, by way of non-limitative example only, to the accompanying drawings, in which.

DETAILED DESCRIPTION OF THE PREFERRED EMBODIMENTS

Figure 1:
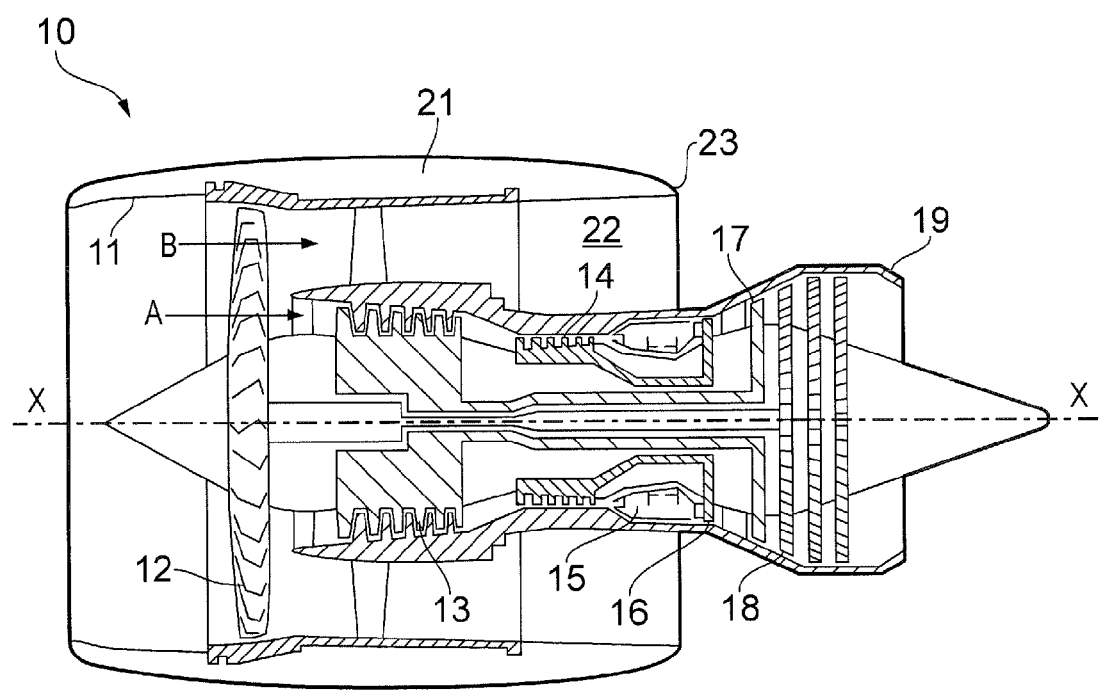
FIG. 1 shows a cross section through a gas turbine engine.

With reference to FIG. 1, a ducted fan gas turbine engine generally indicated at 10 has a principal and rotational axis X-X. The engine 10 comprises, in axial flow series, an air intake 11, a fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive, the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Each of the turbine and compressor contains a number of rotor blades and stator vanes, which may be collected together in annular arrays, which may be referred to as stages. The rotor blades and stator vanes have aerofoil surfaces, over which the working fluid in the engine 10 passes. In this way, the working fluid is compressed by the compressor rotor blades and stator vanes, and expanded by the turbine rotor blades and stator vanes. The blades and vanes are precision engineered in order to ensure optimum performance and efficiency. It is therefore important to ensure that the blades and vanes are manufactured as close to the design geometry as possible.

Figure 2:
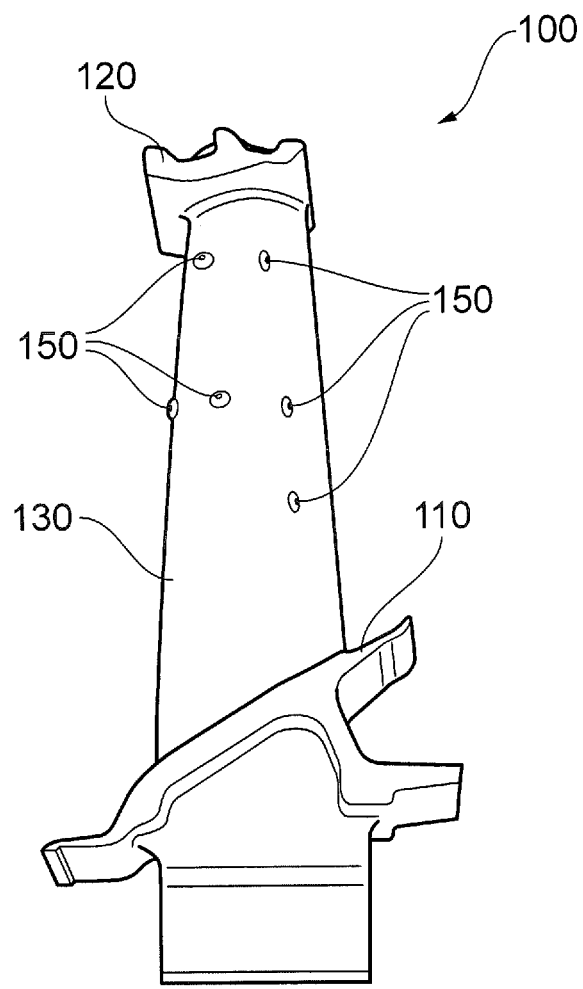
FIG. 2 shows a representation of a blade using scanned 3-D data.

FIG. 2 shows an example of a turbine blade 100 that is part way through manufacture. The turbine blade 100 has been cast into shape, and comprises a platform 110, a shroud 120, and aerodynamic surfaces 130. The aerodynamic surfaces 130 are in the form of an aerofoil.

In the post-cast condition shown in FIG. 2, the aerodynamic surfaces have various imperfections 150, which would have a significant detrimental impact on the blade, and thus the engine, performance if not addressed. As mentioned elsewhere herein, conventionally these imperfections 150, which may be referred to as "plus features", are removed manually by an operator by holding the blades against a moving emery belt.

However, according to the invention, the imperfections 150 are adaptively machined back to the rest of the aerofoil surface 130 in an automated (and thus repeatable) process that results in bespoke machining of each blade 100 so as to ensure a smooth, finished blade 100.

Prior to adaptive machining, the blade 100 (which may be referred to as a "rough" blade) may be inspected for dimensional tolerance to ensure that it will conform to the required shape (or tolerance) after the adaptive machining has been performed. Any suitable method may be used to inspect the blade for dimensional tolerance.

For example, the first step may be to generate electronic 3-D data representing the blade. Indeed, the blade 100 shown in FIG. 2 is an image produced from such electronic 3-D data, rather than an actual image of the blade itself. The electronic 3-D data may be generated by scanning the blade surface, for example using a 3-D structured light system or a laser system.

The electronic representation of the blade surfaces may then be aligned in a virtual space. The blade surfaces can then be inspected against the design geometry in a virtual space in order to check whether it is possible to machine the blade to within the upper and lower tolerance bands. If it is not possible, then the blade can be discarded at this point before any further time or expense is spent generating tooling paths and machining the blade.

Figure 3:
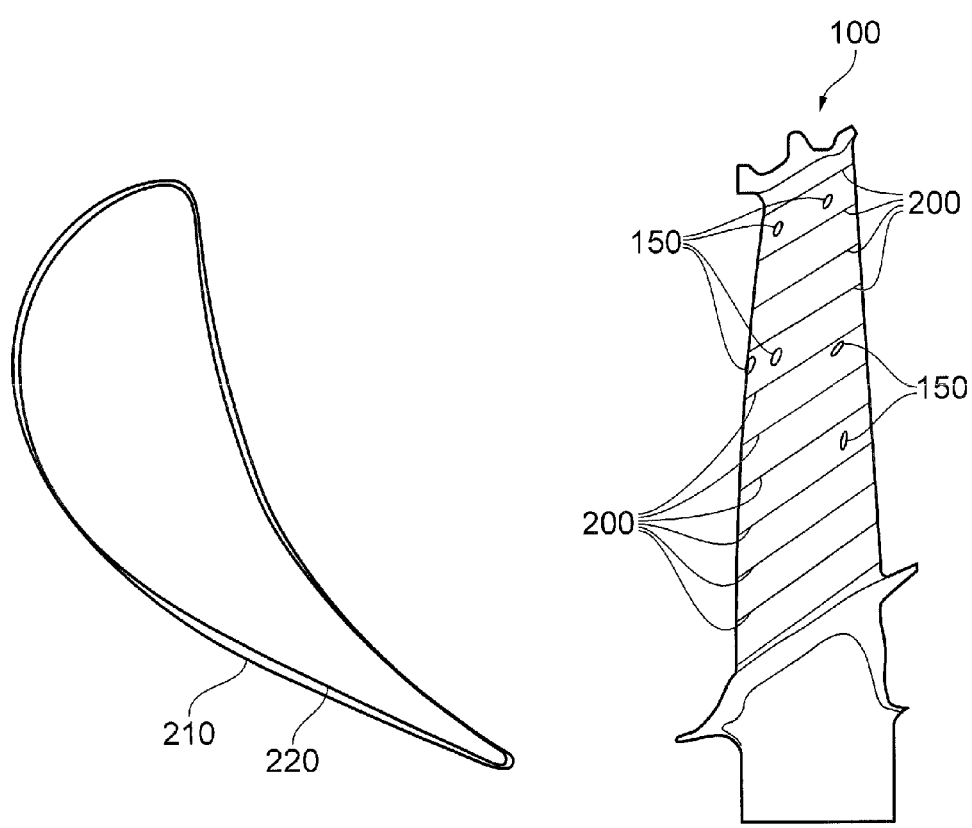
FIG. 3 shows cross-sections through the blade represented in FIG. 2.

One exemplary way of checking whether the blade 100 can be machined to be within tolerance is to take cross-sections through the virtual 3-D geometry, and then compare those cross-sections with cross-sections taken through the same plane for the design geometry. Such a technique is illustrated in FIG. 3, in which cross-sections 200 have been taken through the electronic 3-D geometry of the blade 100. The left hand side of FIG. 3 shows the comparison between a cross-section 210 as cast, and a cross-section 220 as designed. A comparison is made between the two cross-sections 210, 220 to determine whether the cast blade 100 can be machined so as to become within the design tolerance, or whether it should be scrapped at this stage (for example because the surface height of the blade is below the minimum height required to be within design tolerance).

It will be appreciated that other techniques could be used to determine whether a blade 100 should be scrapped or retained after casting, but before machining. For example, it may not be necessary to generate an electronic 3-D representation of the blade 100 at this stage, and instead a CMM technique could be used on the physical blade 100.

If it is determined that the blade 100 can be machined so as to be within design tolerance, the blade 100 is finished using an automated, adaptive process to remove the unwanted blemishes 150 by smoothing them back to the rest of the aerofoil surface 130.

Figure 4:
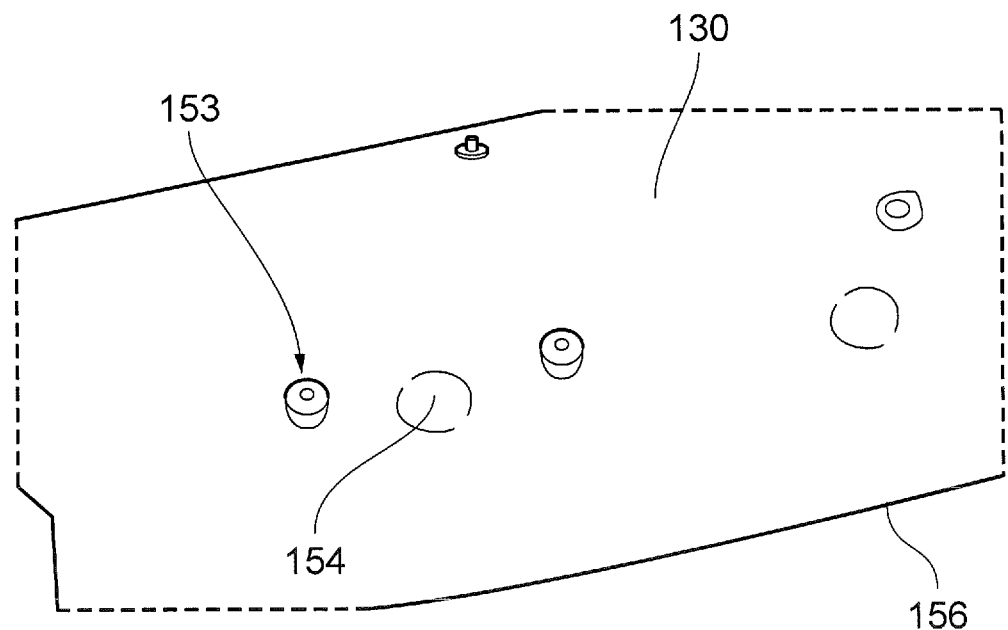
FIG. 4 shows a close-up of features on the blade to be removed.

Finishing the blade 100 requires identification of the features 150 that need to be removed and blended back to the aerodynamic surface 130. A close-up view of examples of such features 150 that need to be identified and removed is shown in FIG. 4. FIG. 4 shows a "p-pin" witness 152, a die repair (for example wax repair) witness 154, and a die line 156, all of which are examples of features 150 that may be produced during casting and which need to be identified and removed to produce the finished blade. These features are also shown in the cross-section of FIG. 5, which illustrates more clearly the impact on the design shape of the aerofoil. The specific defects 152, 154, 156 shown in FIGS. 4 and 5 are only examples of defects that may appear on the surface 130 of a blade 100, as a result of the initial casting (or indeed any other type of forming, such as forging) process.

In order to identify the features for removal, electronic 3-D data representing the aerofoil surface 130 is used. Thus, if such electronic 3-D data has not already been generated in order to determine whether the blade 100 can be made to conform to design tolerance (for example by scanning, for example using 3-D structured light), it is generated at this stage.

Any suitable method or technique may be used in order to identify the features 150 on the blade surface 130 for removal from the scanned, electronic, 3-D data. For example, as mentioned above the step of identifying the features to be removed may comprise comparing the scanned 3-D data at a given position on the scanned surface to the scanned 3-D data at neighbouring positions on the scanned surface so as to determine the local shape of the scanned surfaces. The process may thus involve analysing the surface 130 as a whole, or at least the local surface at each position, in order to determine unwanted "high spots", for example using one or more of the surface height and/or profile gradient and/or derivatives thereof with respect to surface position referred to elsewhere herein.

Figure 5:
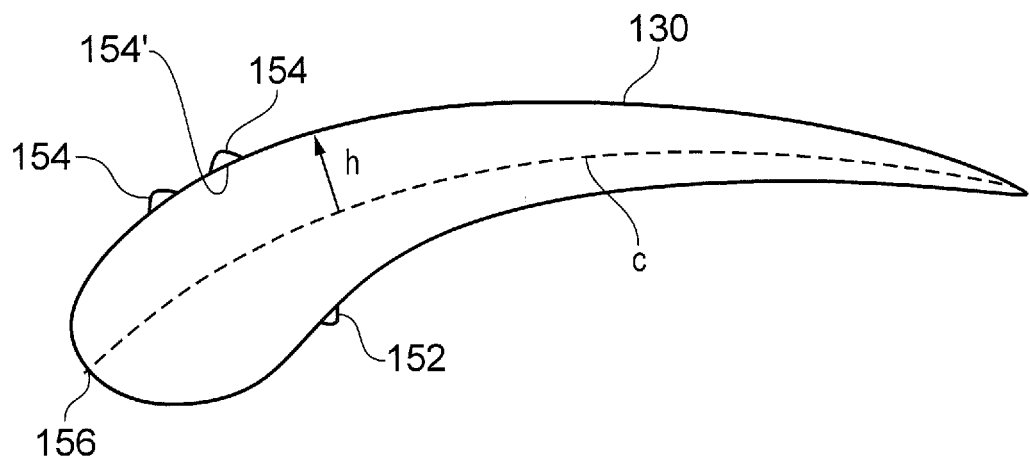
FIG. 5 shows a cross-section through a blade, and also shows the features to be removed.

In this regard, the surface height (which may be referred to as the upper or lower thickness of the aerofoil) may be defined as the perpendicular distance from the camber line "c" of the aerofoil to the aerofoil surface, as shown by the reference label "h" in FIG. 5.

The process may be said to involve identifying anomalies in the rate of change of surface height, profile gradient, and/or derivatives thereof, and then calculating a machining path, or tooling path, to remove such anomalies. In this regard, the method may involve electronically generating a representative "parent" surface from the scanned 3-D data, the parent surface having a smooth, continuous surface, for example no discontinuities in the rate of change of surface height, profile gradient, and/or derivatives thereof, and the "anomalies" could be identified (and subsequently removed) with respect to that "parent" surface. Such a "parent surface" (or local parent surface) may be generated from the scanned 3-D data of the blade 100 alone, and thus need not be the same as the surface of the aerofoil as designed. In general, the design data need not be used in order to determine the features for removal. In FIG. 5, for example, the parent surface is shown by the reference label 154' underneath the defect 154. Thus, in FIG. 5, the "bump" 154 represents the actual surface of the aerofoil 100 as scanned, and the continuous line 154' represents an ideal, smooth, continuous "parent" surface. FIG. 5 is a two dimensional slice through the aerofoil surface, but it will be appreciated that the aerofoil surface may be analysed in three dimensions in order to identify the surface features, or defects, 150 for removal.

Once the features 150 have been identified for removal using, for example, one of the techniques referred to above and/or elsewhere herein, a tooling, or machining, path is generated to remove the features. Specifically, a bespoke tooling path is created to remove the features 150 in such a way as to smoothly blend the region back to the rest of the aerofoil surface 130. Such a smooth blend may be achieved using any suitable technique, such as those disclosed herein. Thus, for example, the tooling path may be determined such that the features 150 are removed in such a way that the resulting aerofoil surface of the blade has no discontinuities in rate of change of surface height and/or profile gradient and/or derivatives thereof with respect to surface position.

The bespoke tooling path may be set so as to generate the "parent" surface as discussed above, for example in relation to FIG. 5.

It will thus be appreciated that the tooling path that is generated is bespoke to each individual blade, because it depends on the precise geometry of the surface of the rough aerofoil, including the defects 150 and the underlying surface 130/154'.

The thickness of the trailing edge of the "rough" blade may also be determined using the scanned 3-D data. If this thickness is determined to be greater than the design intent, then the tooling path may be modified accordingly so as to reduce the trailing edge thickness to the design value. In this way, the trailing edge thickness may be reduced significantly compared with that possible from casting, for example down to under 0.5 mm, for example less than 0.35 mm, for example less than 0.25 mm.

Figure 6:
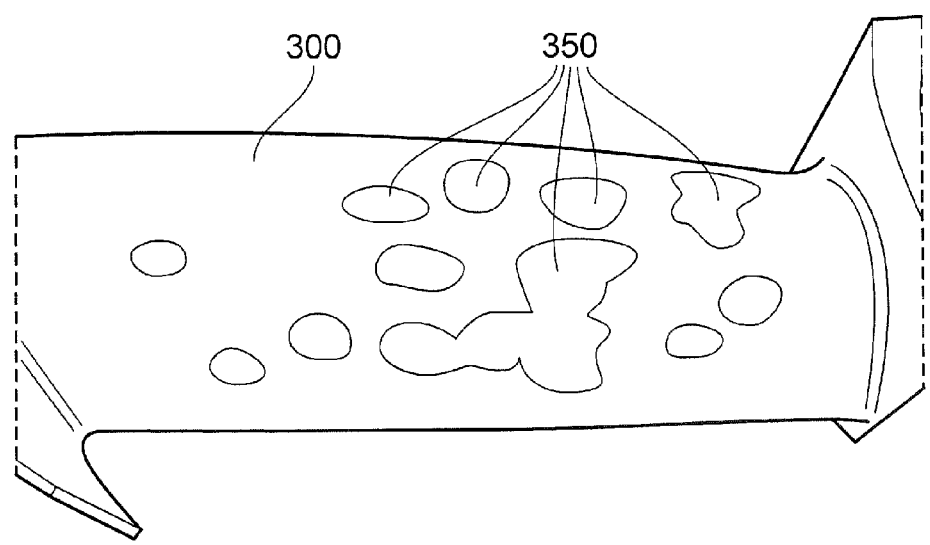
FIG. 6 shows a finished blade, having had the identified features machined away according to the invention.

Once the tooling path has been generated, the physical, rough, blade 100 may be machined, for example by milling and/or grinding. FIG. 6 shows a finished blade 300 after machining according to the bespoke tooling path. The polished regions 350 on the finished blade 300 show the regions where defects (such as "plus-metal" features) have been machined according to the bespoke tooling path and blended back to the underlying surface. As such, the resulting blade 300 has aerofoil surfaces that are smooth, for example having no discontinuities in the rate of change of profile gradient or surface height and/or no faceting, and are thus aerodynamically efficient.

Optionally, an X-ray (such as a CT scan) may be taken of the rough aerofoil 100. The X-ray may be used to determine accurately the wall thickness of the rough aerofoil where the aerofoil has internal cavities. This wall thickness information may be used to modify the bespoke tooling path so as to ensure that the wall is at a predetermined thickness after machining. As such, the method may be used both to remove defects 150 from the surface 130 of a rough aerofoil, and to more accurately control the wall thickness of an aerofoil that includes internal cavities (such as a hollow aerofoil). The internal cavities may or may not be closed cavities. For example, the cavities may be cooling passages and/or weight saving cavities.

After the blade 300 has been finished, a final inspection step may be carried out to ensure that the blade is within design tolerance. Any suitable method could be used for a final inspection step, such as a CMM inspection.

Whilst reference has been made herein to blades, it will be appreciated that the method described and/or claimed herein may apply to both rotating blades (for example compressor, turbine or fan blades) or stationary vanes (for example compressor, turbine or guide vanes), or indeed to any aerodynamic surfaces, such as any aerofoil surfaces. In this regard, both blades and vanes may be referred to as aerofoils. Furthermore, it will be appreciated that any feature described or claimed herein may be combined with any other compatible feature or features. Various modifications to the described method, apparatus and features thereof that fall within the scope of the present invention will be apparent to the skilled person.

I claim:

1. A method of finishing aerodynamic surfaces of a component for a gas turbine engine to produce a finished component from a rough component, the method comprising:
    scanning aerodynamic surfaces of the rough component to obtain scanned electronic 3-D data representing the scanned surfaces of the rough component;
    identifying, using the scanned 3-D data, specific features to be removed from the rough component;
    generating a bespoke tooling path to remove the features identified for removal; and
    machining the rough component according to the generated bespoke tooling path so as to thereby produce a finished component, wherein
    the step of identifying the features to be removed consists of comparing the scanned 3-D data at a given position on the scanned surface to the scanned 3-D data at neighbouring positions on the scanned surface so as to determine the local shape of the scanned surfaces.

2. A method of finishing aerodynamic surfaces of a component according to claim 1, wherein:
    the rough component is the output of a casting or forging process; and
    the specific features identified for removal include plus-metal features produced in the casting or forging process.

3. A method of finishing aerodynamic surfaces of a component according to claim 2, wherein the plus-metal features include features due to at least one of die-lines, casting mould defects and p-pins.

4. A method of finishing aerodynamic surfaces of a component according to claim 1, wherein the bespoke tooling path is generated such that the step of machining involves removing the identified features so as to be smoothly blended to match the surrounding aerodynamic surfaces.

5. A method of finishing aerodynamic surfaces of a component according to claim 1, wherein the step of identifying the features to be removed comprises identifying anomalies in the rate of change of the surface height of the scanned surface.

6. A method of finishing aerodynamic surfaces of a component according to claim 5, wherein a curve-fitting technique is used to identify anomalies in the rate of change of the surface height.

7. A method of finishing aerodynamic surfaces of a component according to claim 1, wherein the step of identifying the features to be removed comprises identifying anomalies in the rate of change of profile gradient of the scanned surface.

8. A method of finishing aerodynamic surfaces of a component according to claim 5, wherein a curve-fitting technique is used to identify in the rate of change of profile gradient.

9. A method of finishing aerodynamic surfaces of a component according to claim 1, further comprising:
    a further step of refining the features identified to be removed by comparing the scanned electronic 3-D data with datum electronic 3-D data representing the aerodynamic surfaces of the component as designed.

10. A method of finishing aerodynamic surfaces of a component according to claim 1, wherein, after the step of machining the rough component to produce the finished component, the finished component is inspected to ensure that it is within design tolerance.

11. A method of finishing aerodynamic surfaces of a component according to claim 1, wherein the component is an aerofoil, and the aerodynamic surfaces are gas-washed surfaces of the aerofoil.

12. A method of finishing aerodynamic surfaces of a component according to claim 11, wherein the step of identifying the features to be removed comprises comparing scanned electronic 3-D data representing the trailing edge of the aerofoil with datum electronic 3-D data representing the trailing edge of the aerofoil as designed; and if the scanned 3-D data shows that the thickness of the trailing edge of the rough aerofoil is greater than the trailing edge as designed, the bespoke tooling path is generated so as to reduce the thickness of the trailing edge.

13. A method of finishing multiple aerofoils for use in a gas turbine engine, the method comprising performing the method of claim 1 to each individual aerofoil, such that the bespoke tooling path generated to remove the features identified for removal is unique to each aerofoil.

14. A method of manufacturing a blade or vane for a gas turbine engine, the blade or vane comprising aerodynamic surfaces, and the method comprising:
 forging or casting a rough component corresponding to the blade or vane; and
 finishing the rough component so as to form the aerodynamic surfaces of the blade or vane using the method of finishing according to claim 1.

15. A blade or vane for a gas turbine engine having an aerodynamic surface finished according the steps of claim 1, the aerodynamic surface being an aerofoil surface.

16. A gas turbine engine comprising at least one blade or vane having an aerodynamic surface finished according to the steps of claim 1, the aerodynamic surface being an aerofoil surface.

* * * * *